United States Patent
Cao et al.

(10) Patent No.: US 10,057,004 B2
(45) Date of Patent: Aug. 21, 2018

(54) CSI-RS BASED CELL DISCOVERY SIGNAL

(71) Applicants: ZTE Wistron Telecom AB, Kista (SE); ZTE (TX) INC., Austin, TX (US)

(72) Inventors: Aijun Cao, Kista (SE); Yonghong Gao, Kista (SE); Thorsten Schier, Kista (SE); Jan Johansson, Kista (SE); Patrick Svedman, Kista (SE); Bojidar Hadjiski, Kista (SE)

(73) Assignee: ZTE WISTRON TELECOM AB, Kista (SE)

( * ) Notice: Subject to any disclaimer, the term of this patent is extended or adjusted under 35 U.S.C. 154(b) by 0 days.

(21) Appl. No.: 15/100,936

(22) PCT Filed: Dec. 11, 2014

(86) PCT No.: PCT/US2014/069773
§ 371 (c)(1),
(2) Date: Jun. 1, 2016

(87) PCT Pub. No.: WO2015/089296
PCT Pub. Date: Jun. 18, 2015

(65) Prior Publication Data
US 2016/0301493 A1    Oct. 13, 2016

Related U.S. Application Data

(60) Provisional application No. 61/933,648, filed on Jan. 30, 2014, provisional application No. 61/914,843, filed on Dec. 11, 2013.

(51) Int. Cl.
*H04J 3/06* (2006.01)
*H04J 11/00* (2006.01)
(Continued)

(52) U.S. Cl.
CPC ....... *H04J 11/0079* (2013.01); *H04J 11/0073* (2013.01); *H04J 11/0076* (2013.01); *H04L 5/0048* (2013.01); *H04W 56/001* (2013.01)

(58) Field of Classification Search
CPC .............. H04J 11/0079; H04J 11/0073; H04J 11/0076; H04W 56/001; H04L 5/0048
See application file for complete search history.

(56) References Cited

U.S. PATENT DOCUMENTS

| | | |
|---|---|---|
| 2011/0235743 A1 | 9/2011 | Lee et al. |
| 2013/0028217 A1 | 1/2013 | Sumasu et al. |
| 2015/0036612 A1* | 2/2015 | Kim ...................... H04B 17/00 370/329 |

FOREIGN PATENT DOCUMENTS

| | | |
|---|---|---|
| CN | 102804625 A | 11/2012 |
| CN | 103339982 A | 10/2013 |

(Continued)

OTHER PUBLICATIONS

International Search Report/Written Opinion dated Apr. 3, 2015 in corresponding PCT Application No. PCT/US2014/069773.
(Continued)

*Primary Examiner* — Afshawn M Towfighi
(74) *Attorney, Agent, or Firm* — Duane Morris LLP

(57) ABSTRACT

A method of small cell discovery in a wireless network deployment using a Channel State Information Reference System (CSI-RS) is proposed. First, a wireless communication system allocates pairs of resource elements in each resource block of a subframe to a CSI-RS configuration. A first of two orthogonal cover codes is applied to the first CSI-RS. The CSI-RS is transmitted by a small cell to a user equipment (UE). The UE utilizes the CSI-RS to perform small cell discovery and measurement of the small cell.

20 Claims, 7 Drawing Sheets

(51) Int. Cl.
   *H04L 5/00*   (2006.01)
   *H04W 56/00*  (2009.01)

(56) References Cited

FOREIGN PATENT DOCUMENTS

| JP | 2012507719 A | 3/2012 |
|---|---|---|
| JP | 2013524569 A | 6/2013 |
| KR | 1020100137391 A | 12/2010 |
| WO | 2010062606 A1 | 6/2010 |
| WO | 2011119005 A2 | 9/2011 |
| WO | 2011125300 A1 | 10/2011 |
| WO | 2012135995 A1 | 10/2012 |
| WO | 2013025558 A1 | 2/2013 |
| WO | 2013040487 A1 | 3/2013 |
| WO | 2013/133596 A1 | 9/2013 |

OTHER PUBLICATIONS

NIT DOCOMO, "Draft CR on small cell discovery for Small cell enhancements", Nov. 11-15, 2013, R1-136005, 3GP TSG RAN WG1 meeting #75, San Francisco, USA, (http://www.3gpp.org/ftp/tsg_ran/wg1_r11/TSGR1_75/Docs/R1-136005.zip), pp. 1-12.

Qualcom Incorporated, "Small cell discovery", Nov. 11-15, 2013, R1-135308, 3GPP TSG-RAN WG1 #75, San Francisco, USA, (http://222.3gpp.org/ftp/tsg_ran/wg1_r11/TSGR1_75/Docs/R1-135308.zip), pp. 1-4.

Intel Corporation, "Discussion on small cell discovery operation", Jan. 28-Feb. 1, 2013, R1-130088.3GPP TSG-RAN WG1 #72, St. Julian's, Malta, (http://www.3gpp.org/ftp/tsg_ran/wg1_r11/TSGR1_72/Docs/R1-130088.zip), pp. 1-4.

3GPP-ETSI TS 136 211 V8.8.0, Oct. 2009, 84 pages.

3GPP-ETSI TS 136 212 V8.8.0, Jan. 2010, 61 pages.

3GPP-ETSI TS 136 213 V8.8.0, Oct. 2009, 78 pages.

Official Action dated Sep. 11, 2017, in corresponding Chinese Patent Application No. 201480073168.3.

3GPP TSG-RAN WGI Meeting #74, R1-133828, Barcelona, Spain, Aug. 2013.

Official Action issued Aug. 8, 2017 in corresponding Japanese Patent Application No. 2016-538626.

Official Action dated Apr. 25, 2018, in corresponding Chinese Patent Application No. 201480073168.3.

* cited by examiner

CSI-RS BASED CELL DISCOVERY SIGNAL

RELATED PATENT APPLICATIONS

This application is a 371 National Phase Application from International Application No. PCT/US2014/069773, filed Dec. 11, 2014 and claims benefit of priority under 35 U.S.C. § 119(e) to Provisional Application No. 61/914,843, entitled "CSI-RS BASED CELL DISCOVERY SIGNAL," filed on Dec. 11, 2013 and Provisional Application No. 61/933,648, entitled "CSI-RS BASED CELL DISCOVERY SIGNAL," filed on Jan. 30, 2014, each of which is incorporated by reference herein in their entireties.

TECHNICAL FIELD

This invention is related to cellular telecommunication systems, and more particularly to a densely deployed network containing many small cells.

BACKGROUND

Today's cellular communication systems provide not only voice services, but also mobile broadband services all over the world. As the number of applications for cell phones and other wireless devices continues to increase, and consume greater amounts of data, an enormous demand for mobile broadband data services is generated. This requires telecom operators to improve data throughput and maximize the efficient utilization of limited resources wherever and whenever possible.

In response to the fact that the spectrum efficiency for point-to-point links is already approaching its theoretical limit, the telecom industry has introduced the concept of a multi-layered network in order to fulfil the growing demands for mobile broadband data services. Generally, a multi-layered network consists of several layers of base stations that provide or enable different physical resources such as carriers, transmit power, etc. A heterogeneous network (HetNet) is one example of a typical two-layered network in which a macro layer consisting of high transmit power base stations (macro layer nodes) is complemented with a low transmit power node (LPN) layer using at least one common carrier. Another example of a heterogeneous network comprises a macro layer complemented with a layer of LPN nodes that provide communications using a different frequency carrier than the macro layer nodes.

One consequence of deploying a multi-layered network, however, is that the density of cell sites must be significantly increased. For example, the inter-site distance between small cells can be 20 meters or less, as compared to a distance of hundreds of meters between macro cells. The hyper-dense deployment requires that user equipment (UE) can discover the surrounding cells in time. However, the legacy cell discovery mechanism that detects synchronization channels (PSS and SSS) is designed and optimized for macro deployment, not for a hyper-dense cell deployment.

The current Channel State Information Reference Symbol (CSI-RS) may be extended for small cell discovery purposes. According to current 3GPP specifications (Rel-11), CSI-RS for one port is one pair of resource elements (RE) in each resource block (RB) in one sub-frame. The term "RB" is used herein to refer to the region of time-frequency plane containing 12 continuous sub-carriers in the frequency domain and one sub-frame in the time domain.

FIG. 1 illustrates one embodiment of a current CSI-RS configuration 100. In the illustrated CSI-RS, there are in twenty pairs of REs 102 defined in each RB 104 for carrying CSI-RS symbols corresponding to twenty configurations. Each pair contains two adjacent REs and a cover code with a length of two is applied onto the pair in order to allow two ports of CSI-RSs to share the same physical REs.

In each configuration, multiple ports {1, 2, 4, 8} can be defined with numbering from port 15 to 22 and a UE may assume that all of the antenna ports from one CSI-RS configuration are quasi-co-located. In order to reduce signaling overhead, a common reference RE pair is defined for a different port setup for the same configuration and a fixed offset in the frequency domain applied onto the common reference RE pair for different ports. An example configuration is shown in Table 1.

TABLE 1

Fixed Offset for each Antenna Port

| Port Nbr. | Port Setup (Normal CP) | | | | Port Setup (Extended CP) | | | |
|---|---|---|---|---|---|---|---|---|
| | 1 | 2 | 4 | 8 | 1 | 2 | 4 | 8 |
| 15 | 0 | 0 | 0 | 0 | 0 | 0 | 0 | 0 |
| 16 | | 0 | 0 | 0 | | 0 | 0 | 0 |
| 17 | | | −6 | −6 | | | −3 | −3 |
| 18 | | | −6 | −6 | | | −3 | −3 |
| 19 | | | | −1 | | | | −6 |
| 20 | | | | −1 | | | | −6 |
| 21 | | | | −7 | | | | −9 |
| 22 | | | | −7 | | | | −9 |

A UE can perform measurements (such as channel estimation, received power estimation, etc.) on each antenna port separately. However, the UE may perform averaging or other filtering across the same RE pair in different RBs. Current CSI-RS configurations can be used for small cell discovery purposes, but can only be applied to UEs in RRC_CONNECTED mode. The serving cell creates a target small cell list intended to be discovered by a specific UE, and decides the CSI-RS configurations for the list. The serving cell informs the corresponding small cells via an X2 interface and informs the UE of the CSI-RS configurations via signaling messages. After the UE receives a certain CSI-RS configuration, the UE finds the accurate timing of the target CSI-RS symbols within a predefined time window by correlating the locally generated CSI-RS samples to the received signal.

There are two main issues for applying the legacy CSI-RS for cell discovery purpose: (1) In a non-quasi-co-located scenario, if only one antenna port in one CSI-RS configuration is used for cell discovery, according to the current 3GPP specifications (Rel-11), only antenna port 15 with the cover code (+1,+1) is used. The other code (+1,−1) applied on the same set of resources is wasted, because it can be used by another small cell as the discovery signal; and (2) Due to the nature of CSI-RS and that CSI-RS RE pairs are repeated once in each RB, there are many peaks in its auto-correlation function and the distance between two adjacent peaks is around 5.56 microseconds (μs) as illustrated in FIGS. 2A-2B.

If the searching window size is more than 5.56 μs when the UE performs refined time synchronization, then there will be two peaks with the similar magnitude in the results, even if there is no noise in the signal. This peak ambiguity problem introduces severe ISI (inter-symbol interference), degrading the detection and measurement performance of CSI-RS. Multiple antenna ports for one CSI-RS configuration according to the current specifications cannot solve the peak ambiguity problem, as the above mentioned operations are performed independently on each antenna port.

SUMMARY OF THE INVENTION

In one embodiment, a CSI-RS configured for small cell discovery contains additional REs in each RB as compared with the legacy allocation, where one port of CSI-RS occupies one RE pair in each RB. The RE pairs are evenly distributed in the frequency domain. In each RB, the occurrence of a small cell discovery CSI-RS is configured to make the auto-correlation function peak time difference larger than the actual search window size of one or more UEs.

In one embodiment comprising a synchronized small cell cluster, a UE must acquire timing before proceeding with detection and/or measurements of CSI-RS as the small cell discovery signal, as the synchronized small cell cluster creates uncertainty on the UE side of the timing of the CSI-RS. The UE first uses primary synchronization signals (PSS) and/or secondary synchronization signals (SSS) to acquire timing of the synchronized cluster. This PSS/SSS may come from the same cell which transmits its CSI-RS and/or from the strongest cell which is synchronized to the cell which transmits its CSI-RS. After the UE acquires the timing, the UE locates the configured CSI-RS and performs cell discovery and measurement accordingly. The UE reports the discovered cell to the serving cell.

BRIEF DESCRIPTION OF THE DRAWINGS

The present invention, in accordance with one or more various embodiments, is described in detail with reference to the following Figures. The drawings are provided for purposes of illustration only and merely depict exemplary embodiments of the invention. These drawings are provided to facilitate the reader's understanding of the invention and should not be considered limiting of the breadth, scope, or applicability of the invention. It should be noted that for clarity and ease of illustration these drawings are not necessarily made to scale.

DETAILED DESCRIPTION OF EXEMPLARY EMBODIMENTS

In one embodiment, a CSI-RS is configured for small cell discovery. The CSI-RS is configured to contain additional resource elements (REs) in each resource block (RB) as compared with the legacy allocations. One port of the CSI-RS occupies one RE pair in each RB. The RE pairs are evenly distributed in the frequency domain. In some embodiments, in each RB, the occurrence of a small cell discovery CSI-RS is configured to make the auto-correlation function peak time difference larger than the actual search window size of one or more UEs. When a CSI-RS is configured for small cell discovery purposes, the CSI-RS can be configured with one of two cover codes (+1,+1) or (+1,−1). Utilizing CSI-RS configured for small cell discovery, a UE may not assume that antenna ports from one CSI-RS discovery configuration are quasi-co-located. In some embodiments, the total number of overlapping small cells transmitting CSI-RS signals supported is increased from twenty to forty.

Figure 1:
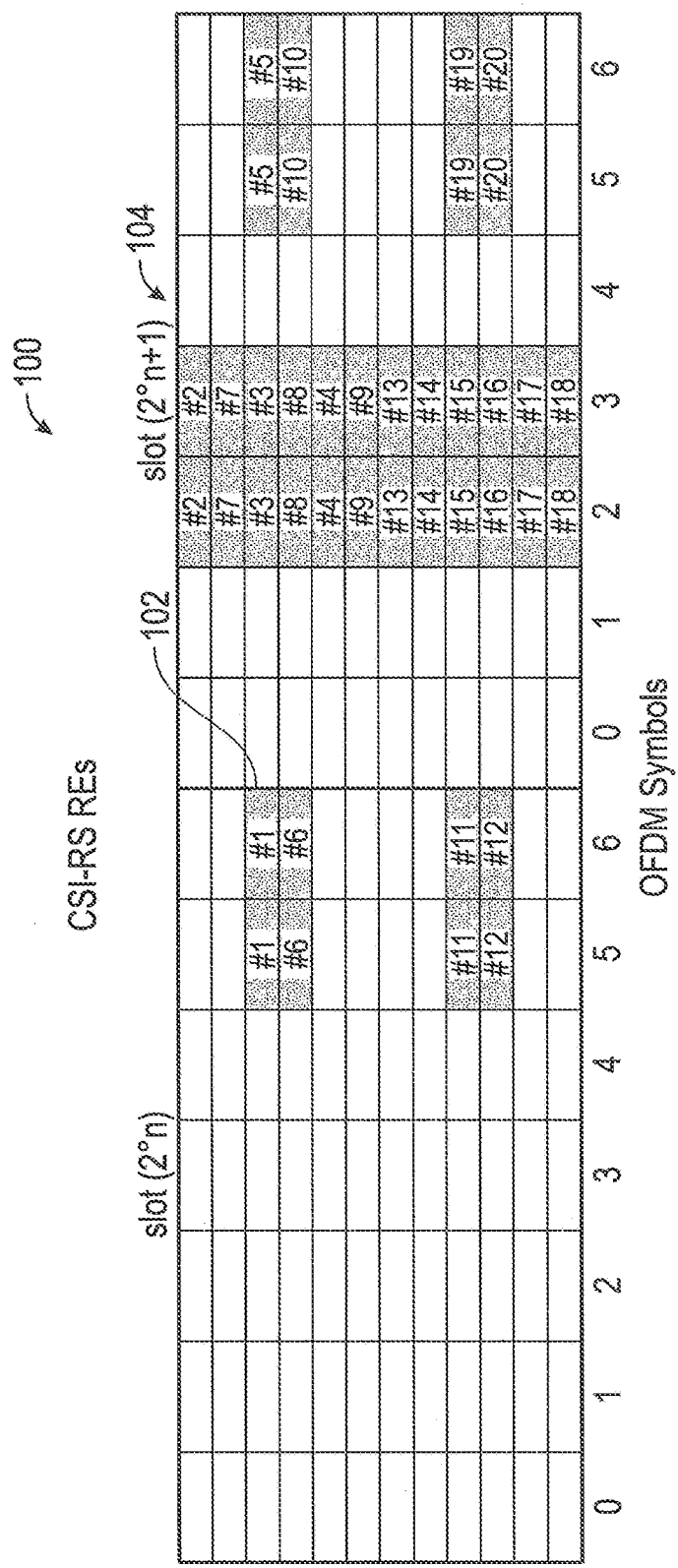
FIG. 1 illustrates one embodiment of a plurality of Channel State Information Reference Symbols (CSI-RS) and configurations.
Figure 2A:
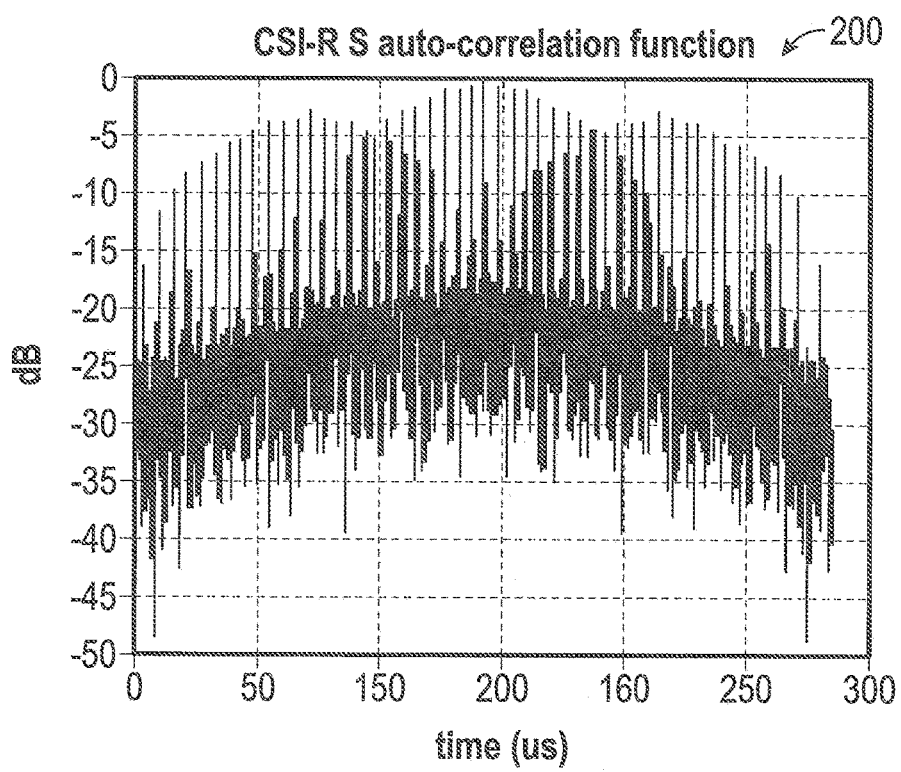
FIG. 2A is a graph illustrating one embodiment of an auto-correlation function of a CSI-RS resource element (RE) pairs.
Figure 2B:
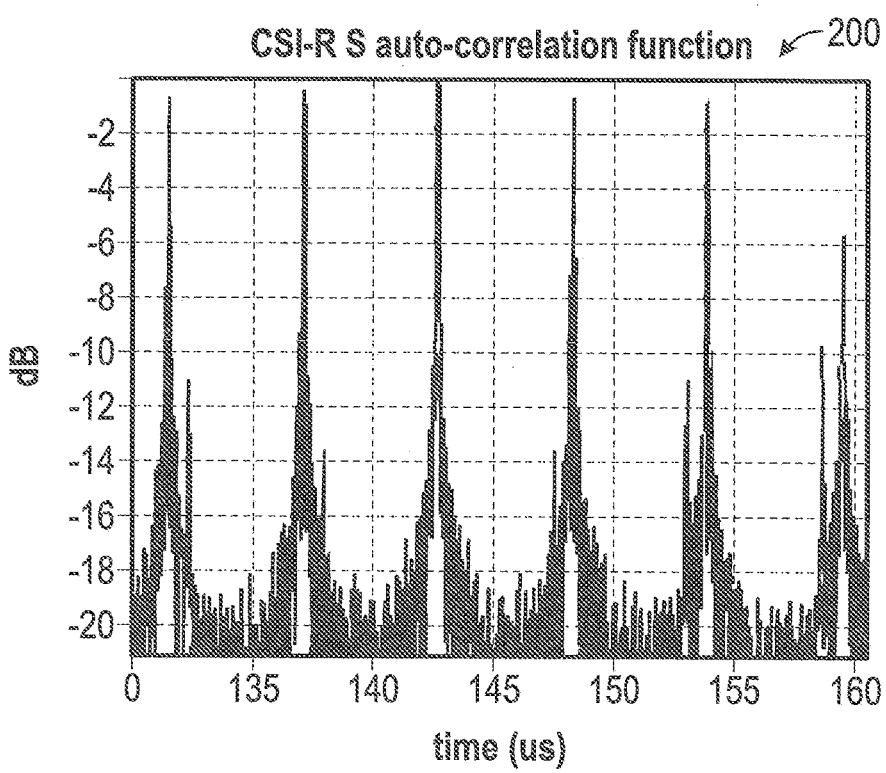
FIG. 2B is a graph illustrating a portion of the auto-correlation function of FIG. 2A between 130 μs and 160 μs.
Figure 3:
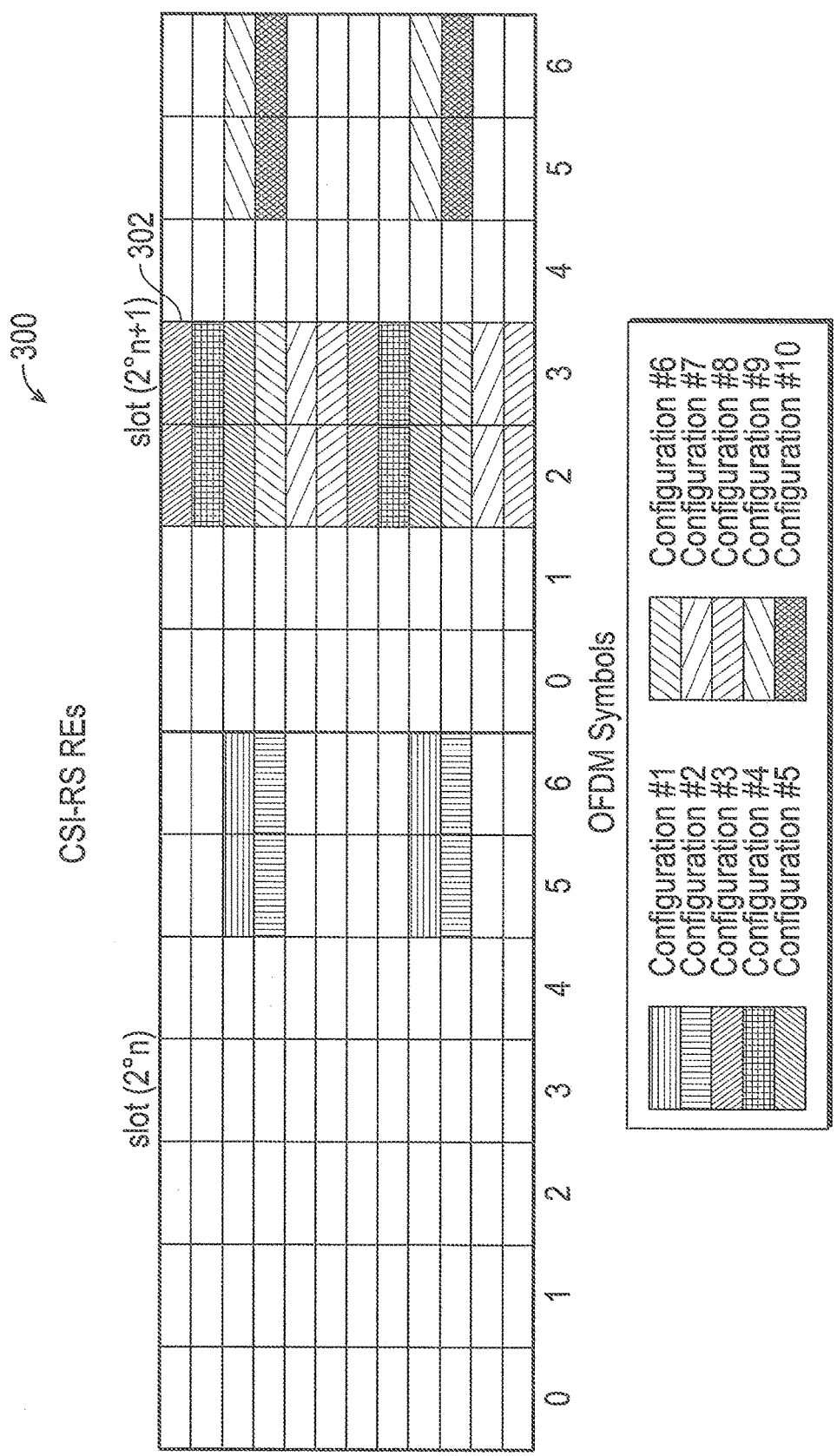
FIG. 3 illustrates one embodiment of a RE allocation for small cell discovery CSI-RS.
Figure 4A:
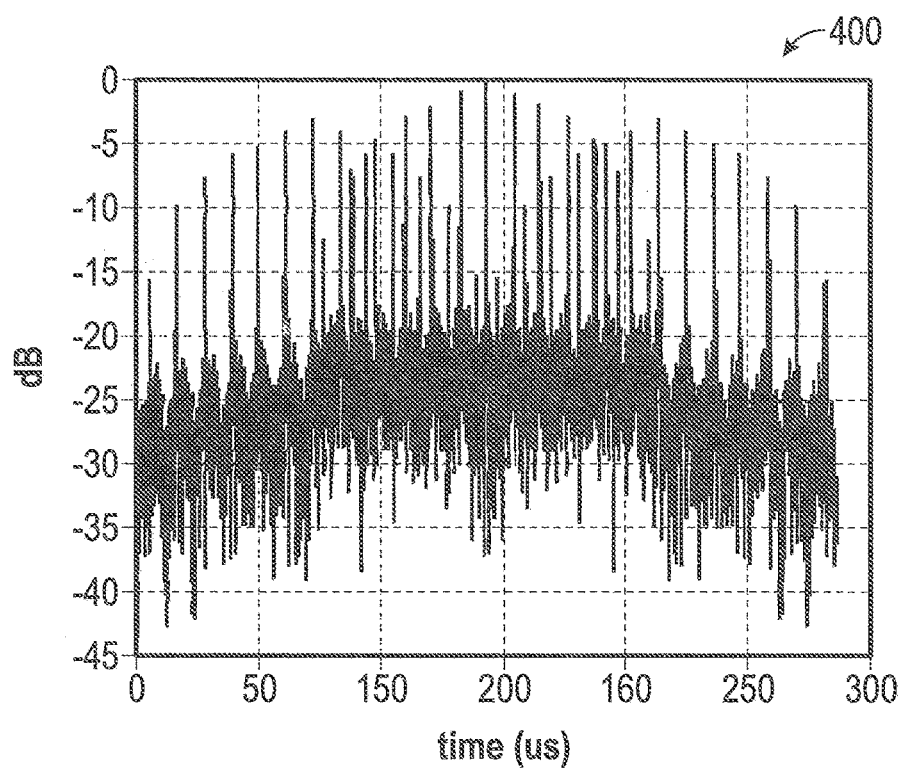
FIG. 4A is a graph illustrating one embodiment of an auto-correlation function of a CSI-RS RE pair having a window size smaller than 11.02 μs.
Figure 4B:
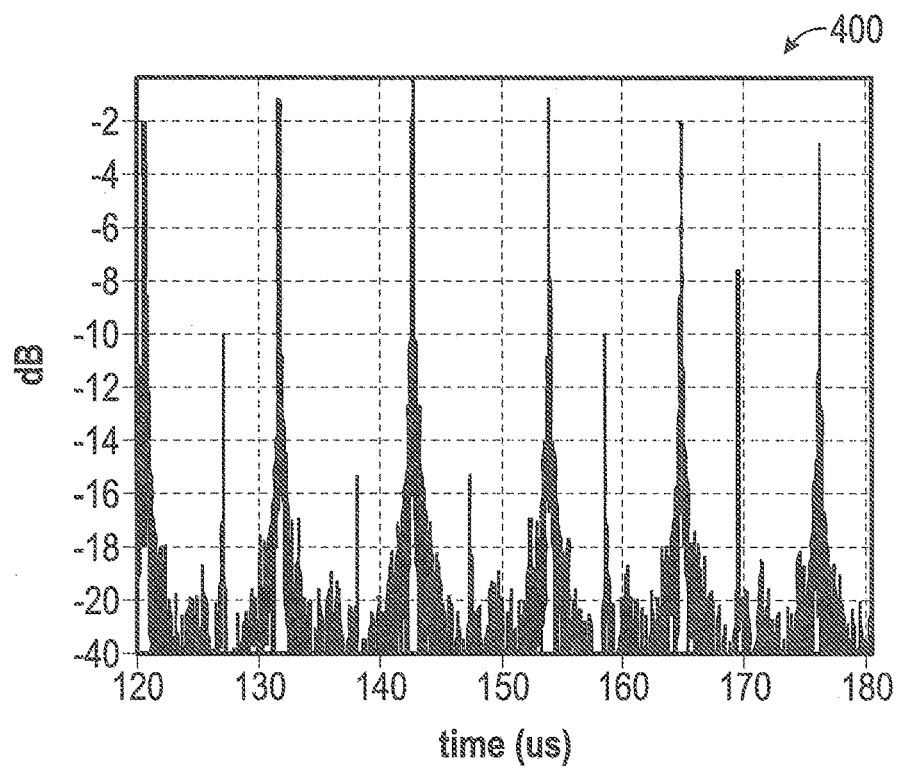
FIG. 4B is a graph illustrating a portion of the auto-correlation function of FIG. 4A between 120 μs and 180 μs.

In one embodiment, if the total number of REs defined for CSI-RS in one subframe remains the same as the legacy CSI-RS (e.g., less than twenty), then the CSI-RS for small cell discovery can be configured with more REs and evenly distributed in the frequency domain. FIG. 3 illustrates one embodiment of an evenly distributed CSI-RS 300. The number of REs 302 for each port of the CSI-RS 300 is doubled for the small cell discovery at cost of reducing the total number of available configurations. In the embodiment illustrated in FIG. 3, if the searching window size is smaller than a predetermined threshold, such as, for example, 11.02 μs, the peak ambiguity issue in the auto-correlation function of the CSI-RS is solved. FIG. 4A is a graph illustrating an autocorrelation function 400 of an RE pair of the CSI-RS 300 of FIG. 3. FIG. 4B illustrates a portion of the autocorrelation function 400 between 120 μs and 180 μs. In some embodiments, CSI-RSs discovery signals from two different small cells can share the same configuration by applying orthogonal cover codes, such as, for example, {(+1,+1),(+1,−1)}.

In one embodiment, all twenty legacy CSI-RS configurations are grouped into 10 new discovery configurations as shown in Table 2.

TABLE 2

CSI-RS combinations for cell discovery purposes

| New Configuration # | Combination of the current CSI-RS configuration # | |
| --- | --- | --- |
| 1 | 1 | 11 |
| 2 | 6 | 12 |
| 3 | 2 | 13 |
| 4 | 7 | 14 |
| 5 | 3 | 15 |
| 6 | 8 | 16 |
| 7 | 4 | 17 |
| 8 | 9 | 18 |
| 9 | 5 | 19 |
| 10 | 10 | 20 |

A UE can be configured with two current CSI-RS configurations according to Table 2, and the UE can process the signals from the two CSI-RS configurations simultaneously when performing CSI-RS based time and frequency synchronization. CSI-RS discovery signals from two different small cells can share the same configuration by applying orthogonal cover codes, such as, for example, {(+1,+1),(+1,−1)}.

Figure 5:
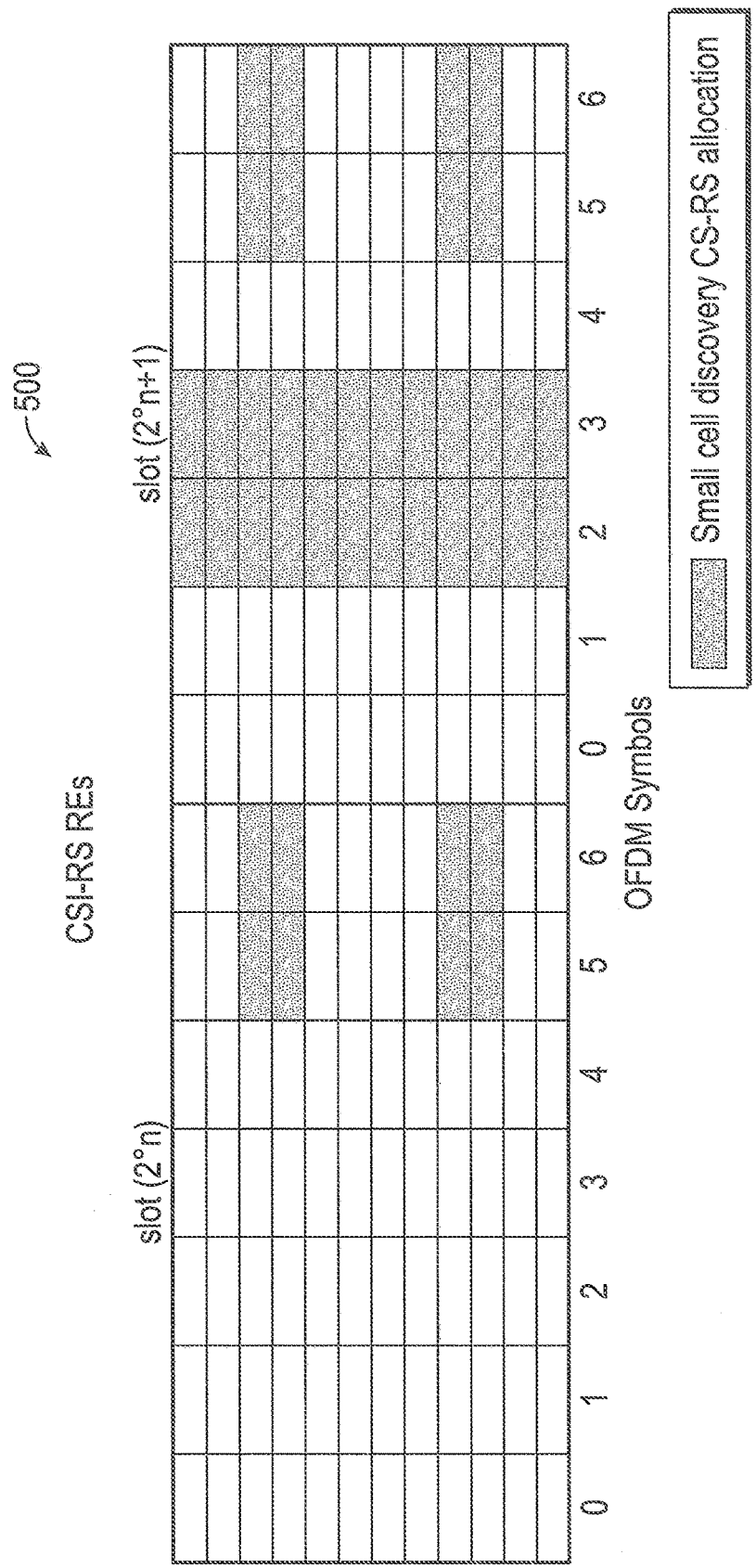
FIG. 5 illustrates one embodiment of an RE allocation for small cell discovery CSI-RS.
Figure 6:
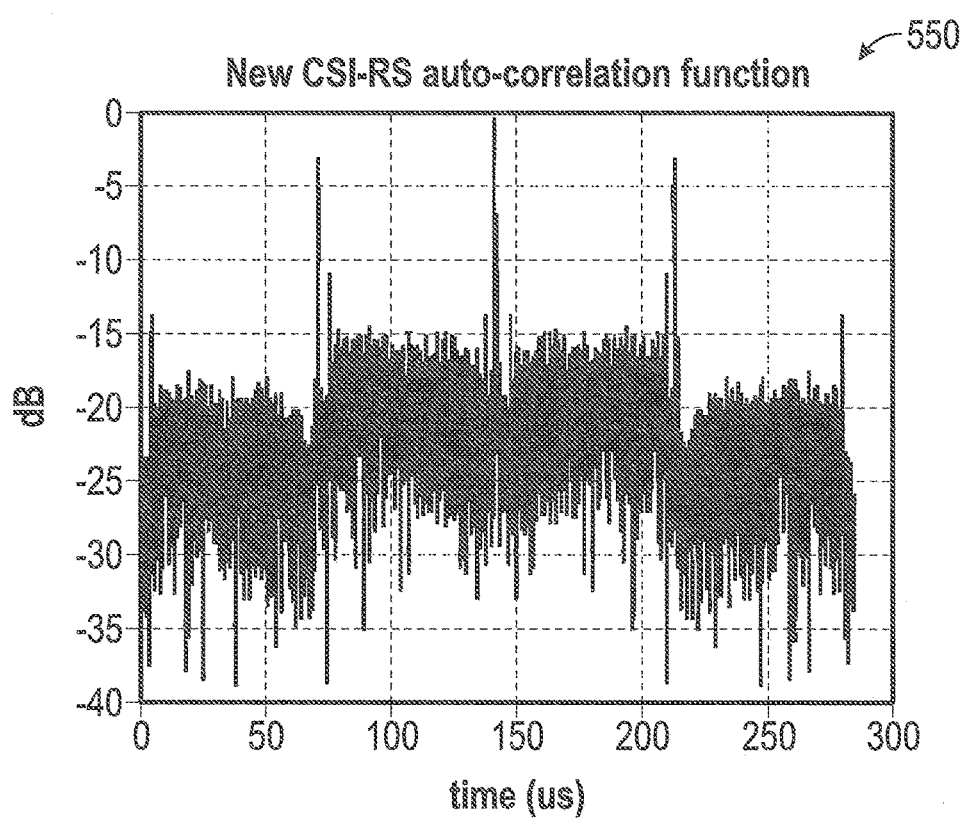
FIG. 6 is a graph illustrating one embodiment of the auto-correlation function of the CSI-RS of FIG. 5.

FIG. 5 illustrates one embodiment of a CSI-RS 500 in which the total number of REs per RB remains unchanged from the legacy CSI-RS with the small cell discovery CSI-RS occupying all of the twenty-four REs in the middle of the subframe. FIG. 6 is a graph illustrating one embodiment of an autocorrelation function 550 of the CSI-RS 500 of FIG. 5. As shown in FIG. 6, the distance between two peaks is about 66.72 µs which enables the possibility of a larger searching window without peak ambiguity. The distance between the two-peaks may be determined by the CSI-RS configuration. The CSI-RS discovery signals from two different small cells can share the same configuration by applying orthogonal cover codes, such as, for example, $\{(+1,+1),(+1,-1)\}$. In some embodiments, the cover codes can be other orthogonal codes, such as, for example, $\{(0,1), (1,0)\}$, etc.

In one embodiment, a set of new REs other than the existing legacy CSI-RS REs are defined for small cell discovery purpose. CSI-RS discovery signal symbols may be directly mapped to the physical REs without a cover code. The REs from one CSI-RS discovery signal are evenly distributed in the frequency domain. In the time domain, the corresponding time durations of those REs may comprise completely overlapping REs, non-overlapping REs, and/or partially overlapping REs. In this embodiment, up to forty small cells with overlapping CSI-RS configurations may be supported.

Figure 7:
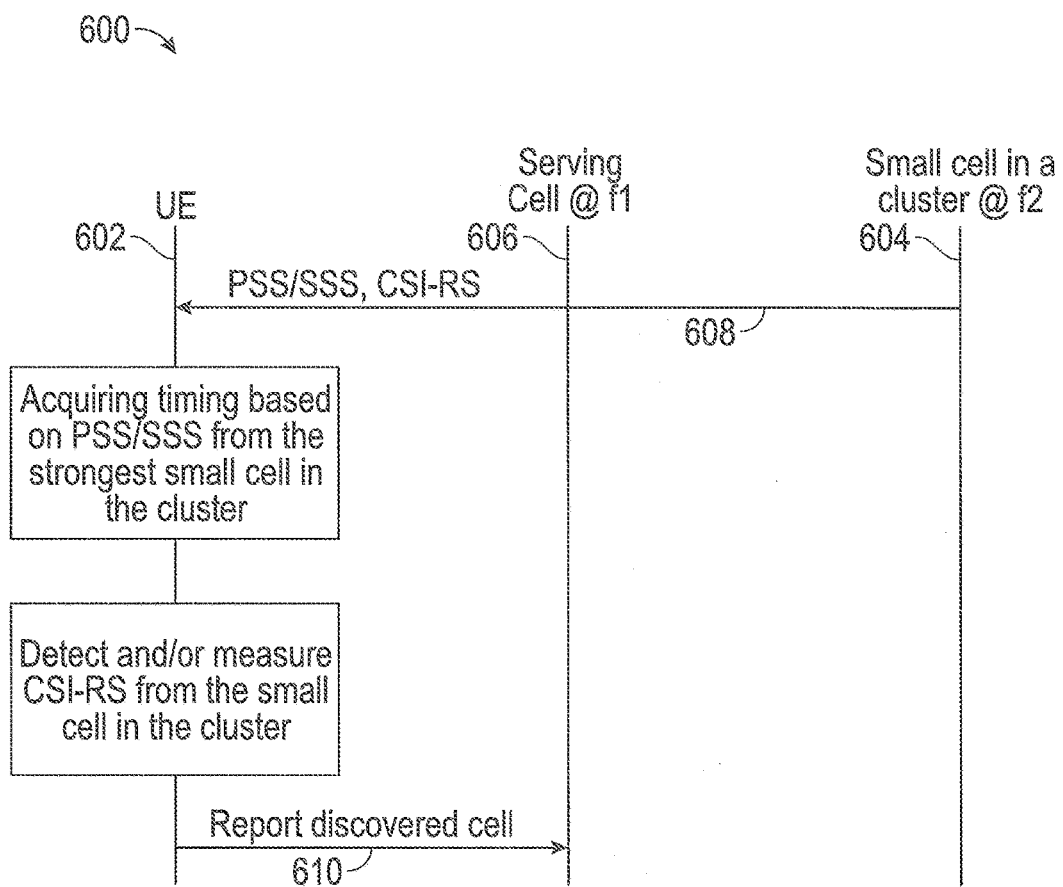
FIG. 7 illustrates one embodiment of CSI-RS cell discovery in a synchronized small cell cluster.

FIG. 7 illustrates one embodiment of CSI-RS cell discovery in a synchronized small cell cluster 600. In this embodiment a UE 602 may need to acquire timing before proceeding with detection and/or measurements of CSI-RS as the small cell discovery signal, as there may be uncertainty on the UE 602 side of the timing of CSI-RS in the synchronized cluster 600. The UE 602 uses a PSS/SSS 608 to acquire timing of the synchronized cluster. The PSS/SSS 608 may come from the same cell 604 which transmits the CSI-RS and/or from the strongest cell which is synchronized to the cell which transmits the CSI-RS. After the UE 602 acquires the timing, the UE 602 locates the configured CSI-RS and performs cell discovery and measurement on the discovered cell 604. The UE 602 reports 610 the discovered cell to the serving cell 606.

The word "exemplary" is used herein to mean "serving as an example or illustration." Any aspect or design described herein as "exemplary" is not necessarily to be construed as preferred or advantageous over other aspects or designs.

The preceding merely illustrates the principles of the disclosure. It will thus be appreciated that those of ordinary skill in the art will be able to devise various arrangements which, although not explicitly described or shown herein, embody the principles of the disclosure and are included within its spirit and scope. Furthermore, all examples and conditional language recited herein are principally intended expressly to be only for pedagogical purposes and to aid the reader in understanding the principles of the disclosure and the concepts contributed by the inventors to furthering the art, and are to be construed as being without limitation to such specifically recited examples and conditions.

While one or more embodiments of the invention have been described above, it should be understood that they have been presented by way of example only, and not by way of limitation. Likewise, the various figures or diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations.

One or more of the functions described in this document may be performed by an appropriately configured module.

The term "module" as used herein, can refer to hardware, firmware, software and any associated hardware that executes the software, and any combination of these elements for performing the associated functions described herein. Additionally, various modules can be discrete modules; however, as would be apparent to one of ordinary skill in the art, two or more modules may be combined to form a single module that performs the associated functions according to various embodiments of the invention.

Additionally, one or more of the functions described in this document may be performed by means of computer program code that is stored in a "computer program product", "non-transitory computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

It will be appreciated that any suitable distribution of functionality between different functional units, processors or domains may be used without detracting from the invention. For example, functionality illustrated to be performed by separate units, processors or controllers may be performed by the same unit, processor or controller. Hence, references to specific functional units are only to be seen as references to suitable means for providing the described functionality, rather than indicative of a strict logical or physical structure or organization.

What is claimed is:

1. A device to support Channel State Information Reference System (CSI-RS) discovery in a wireless network deployment, comprising:
  a wireless communication system, which in operation:
    configures a first CSI-RS with a first of two orthogonal cover codes, wherein the first of the two orthogonal cover codes is associated with a first cell and a second of the two orthogonal cover codes is associated with a second cell;
    distributes a plurality of resource element pairs evenly over a resource block; and
    transmits the first CSI-RS to at least one user equipment (UE).

2. The device of claim 1, wherein the first CSI-RS is configured such that an auto-correlation function peak time difference is greater than a search window size of the at least one UE.

3. The device of claim 1, wherein if a total number of resource element pairs defined for the first CSI-RS in one subframe is less than or equal to twenty, the first CSI-RS is configured to evenly distribute the resource element pairs in a frequency domain of the resource block.

4. The device of claim 1, wherein the wireless communication system in operation:
  configures a second CSI-RS with the second of the two orthogonal cover codes; and
  transmits the second CSI-RS at least partially simultaneously with the first CSI-RS.

5. The device of claim 4, wherein the UE is configured to simultaneously process the first CSI-RS and the second CSI-RS.

6. The device of claim 1, wherein the first CSI-RS is configured to support forty cells.

7. The device of claim 1, wherein the two orthogonal cover codes comprise a first cover code (+1,+1) and a second cover code (+1,−1).

8. The device of claim 1, wherein the wireless communication system in operation:
- transmits a primary synchronization signal or a secondary synchronization signal (PSS/SSS) to the UE;
- wherein the first CSI-RS is transmitted by the first cell of a synchronized cluster.

9. The device of claim 8, wherein the first cell of the synchronized cluster comprises a strongest cell of the synchronized cluster.

10. The device of claim 8, wherein the wireless communication system in operation receives a cell discovery report from the UE.

11. A method of cell discovery in a wireless network deployment, comprising:
- allocating, by a first cell, resource element pairs in each resource block of a first subframe to a first Channel State Information Reference System (CSI-RS) configuration;
- applying, by the first cell, a first of two orthogonal cover codes to the first CSI-RS, wherein the first of the two orthogonal cover codes is associated with the first cell and a second of the two orthogonal cover codes is associated with a second cell; and
- transmitting, by the first cell, the first CSI-RS to a user equipment (UE).

12. The method of claim 11, further comprising each resource block of the first CSI-RS to make an autocorrelation function peak time difference of each resource block greater than a search window size of the UE.

13. The method of claim 11, further comprising evenly distributing the allocated resource elements in each resource block in a frequency domain.

14. The method of claim 11, further comprising:
- allocating, by the second cell, resource elements in each resource block of a second subframe to a second CSI-RS configuration;
- applying, by the second cell, the second of the two orthogonal cover codes to the second CSI-RS; and
- transmitting, by the second cell, the second CSI-RS to the UE.

15. The method of claim 14, further comprising simultaneously processing, by the UE, the first CSI-RS and the second CSI-RS to perform CSI-RS detection.

16. The method of claim 14, wherein the two orthogonal cover codes comprise a set of cover codes {(+1,+1), (+1,−1)}.

17. The method of claim 14, further comprising transmitting, by the second cell, a primary synchronization signal or a secondary synchronization signal (PSS/SSS) to the UE, wherein the second cell comprises a cell of a synchronized cluster.

18. The method of claim 17, further comprising transmitting, by the UE, a cell discovery response to the first cell.

19. A method for performing Channel State Information Reference System (CSI-RS) discovery by a User Equipment (UE), the method comprising:
- receiving, by the UE, a primary synchronization signal or a secondary synchronization signal (PSS/SSS) from a small cell, wherein the small cell is part of a synchronized cluster of cells;
- acquiring, by the UE, a timing of a CSI-RS transmission using the PSS/SSS; and
- performing, by the UE, cell discovery and measurement on the small cell using the CSI-RS transmission, wherein the CSI-RS transmission is encoded with a first of two orthogonal cover codes, wherein the first of the two orthogonal cover codes is associated with the small cell and a second of the two orthogonal cover codes is associated with another small cell.

20. The method of claim 19, further comprising transmitting, by the UE, a cell discovery report to a serving cell.

* * * * *